United States Patent [19]

Sasaki

[11] Patent Number: 4,837,970
[45] Date of Patent: Jun. 13, 1989

[54] METHOD OF SELECTING LIVE SUGAR BEET SEEDS FROM A MIXTURE OF LIVE AND DEAD SEEDS

[75] Inventor: Yukio Sasaki, Obihiro, Japan

[73] Assignee: Nippon Tensaiseito Kabushiki Kaisha, Tokyo, Japan

[21] Appl. No.: 37,228

[22] Filed: Apr. 10, 1987

[30] Foreign Application Priority Data

Oct. 9, 1986 [JP] Japan .................. 61-241100

[51] Int. Cl.$^4$ .............................................. A01C 1/00
[52] U.S. Cl. ............................................. 47/14; 47/58; 47/DIG. 9
[58] Field of Search ............ 47/61, 14, DIG. 9; 56/126; 99/600, 629, 518

[56] References Cited

U.S. PATENT DOCUMENTS

| | | | |
|---|---|---|---|
| 2,232,697 | 2/1941 | Earle | 99/518 |
| 3,992,814 | 11/1976 | Hagner | 47/1 R X |
| 4,467,560 | 8/1984 | Simak | 209/172 X |

Primary Examiner—Richard J. Johnson
Assistant Examiner—Jeffrey L. Thompson
Attorney, Agent, or Firm—Oliff & Berridge

[57] ABSTRACT

A method for selecting live seeds of sugar beet (those which are able to germinate) from dead seeds (those which are unable to germinate) based on the case of seed-cap releasing. When immersed in water, live seeds absorb much water and expand appreciably, while dead seeds expand only slightly because less water is absorbed. This expansion of live seeds upon absorption of water makes the seed caps, closely fitted onto the outer shells of fruit, ready to be released. When mechanical vibrations are given to a mixture of water-soaked fruit, only the seed caps of expanded fruit are easily released. Thus live seeds of sugar beet can be effectively obtained by selecting out the fruit from which seed caps have been released.

3 Claims, 1 Drawing Sheet

GERMINATION STEP AND GROWN RADICLES DAMAGING RATE AFTER DRYING TREATMENT

| GERMINATION STEP | 1 | 2 | 3 | 4 |
|---|---|---|---|---|
| TIMING IN FIG. 1 | ● | ○ | △ | × |
| SCHEMATIC ILLUSTRATION | ○ | ⊖ | ⊖ | ⌣ |
| GROWN RADICLES DAMAGING RATE (%) | 0 | 0 | 25 | 95 |

METHOD OF SELECTING LIVE SUGAR BEET SEEDS FROM A MIXTURE OF LIVE AND DEAD SEEDS

BACKGROUND OF THE INVENTION

1. Technical Field

This invention relates to a method of effectively selecting live seeds (those which are able to germinate) of sugar beet out of a mixture thereof with dead seeds (those which are unable to germinate), thereby enhancing the germination rate of sown seeds.

2. Description of the Prior Art

The fruit of sugar beet (the material for the production of beet sugar) is of two types: polyembryonic and monoembryonic. The latter type is more commonly used because of the better adaptability to sowing machines and less labor required for subsequent thinning work.

Sugar beet is a biennial plant. Vegetative propagation progresses to grow its roots in the first year after sowing, and reproductive propagation follows in the second year, resulting in florescence and fructification. The fruit of sugar beet is characterized in that each piece has a seed cap closely fitted onto the outer shell.

The harvested fruit is usually freed from impurities, made even in grain size, and stored as seeds to be sown in the next season. Not all of the seeds thus selected germinate when sown, the rate of germination usually being about 90%. This indicates that the stored seeds are a mixture of live and dead seeds. The rate of germination could be enhanced if the live seeds are selected out of the mixture and only the selected seeds are sown.

No effective method is presently available to sort live seeds of sugar beet from dead seeds, but many sorting methods have been proposed for seeds in general. For example, U.S. Pat. No. 3,992,814, patented Nov. 23, 1976, discloses a technique, in which seeds are incubated to a state just before the start of germination, the incubated seeds are aligned on the surface of a liquid, and a downward stream from the surface is created, thus forcing the live seeds to descend. U.S. Pat. No. 4,467,560, patented Aug. 28, 1984, teaches a method in which seeds soaked with water are allowed to stand until just before the start of germination, followed by drying, and live seeds are sorted from dead seeds by utilizing the difference in the degree of water absorption. The present inventor has found that, if the fruit of sugar beet is immersed in water until just before the roots begin to come out, live seeds expand as a result of water absorption to make the closely fitted seed caps readily releasable. Based on these findings, I established a technique for selecting live seeds out of dead seeds, and applied for Japanese patent application No. 235,331, filed Oct. 23, 1985, not laid open.

When the techniques described in the above-mentioned U.S. Pat. Nos. 3,992,814 and 4,467,560 (both relying solely upon weight differences for sorting) are applied to the sugar beet seeds, the sorting accuracy is very low because the weight fluctuation among individual fruits is great and because the outer shell occupies about 50 to 60% of the total fruit (on dry basis), thus making the percentage of water absorption in the shell predominate in both live and dead seeds. In the method described in Japanese patent application No. 235,331, live seeds (fruit) of sugar beet can be effectively distinguished from dead seeds by the release of seed caps, but it leaves much room for improvement because the conditions that cause easy release of the seed caps are limited to a very narrow range.

It is generally accepted that the optimum condition for harvesting high-quality sugar beet at high yields is even growing of 70,000 plants per hectare. When seeds are sown in numbers that correspond to this density, there will be missing plants because of the dead seeds involved. If an excessive number of seeds are sown to make up these wanted plants, a great deal of labor is needed for subsequent thinning work. In Japan, a culture technique using paper tubes known under the name of Paperpot (registered tradename) is popular for seedling culture and transplantation of sugar beet (now occupying 98% of its total planting). In this case, too, the highest production efficiency can be expected only when all the sown seeds germinate. Presence of dead seeds requires additional work to manually or mechanically select and remove the vacant paper tubes prior to transplantation. When this work is omitted, additional seedlings have to be set out after transplantation. The increase in cost caused by the vacant paper tubes is also enormous. Thus, there has been a great demand for a method of selecting live seeds of sugar beet that will surely germinate and assure high-quality products at high yields.

SUMMARY OF THE INVENTION

A primary object of this invention is to provide a method for selectively collecting live seeds of sugar beet out of a mixture of live and dead seeds.

A further object of this invention is to provide a method for selecting live seeds (fruit) of sugar beet simply by soaking them in water under specific conditions, followed by drying and soaking once again.

Another object of this invention is to provide a method for selecting live seeds of sugar beet by soaking them in water under specific conditions, followed by the application of mechanical vibrations.

A still further object of this invention is to provide a method for selecting live seeds of sugar beet, which comprises releasing seed caps by the application of mechanical vibrations as defined above, thereby allowing the sorting of live seeds by color.

A still further object of this invention is to provide a method for selecting live seeds of sugar beet, in which the process of soaking in water also helps facilitate the subsequent germination.

The method of this invention makes the culture of sugar beet outstandingly efficient, and produces sugar beet at higher yields.

This invention relates to a method for selectively collecting only live fruit (seeds) of sugar beet out of a mixture thereof with dead fruit (seeds), which comprises immersing said mixture with water, drying said water-soaked seeds, and soaking the dry seeds with water once again to promote germination, thereby releasing the seed caps from the fruit.

DETAILED DESCRIPTION OF THE PREFERRED EMBODIMENTS

Figures 1, 2:
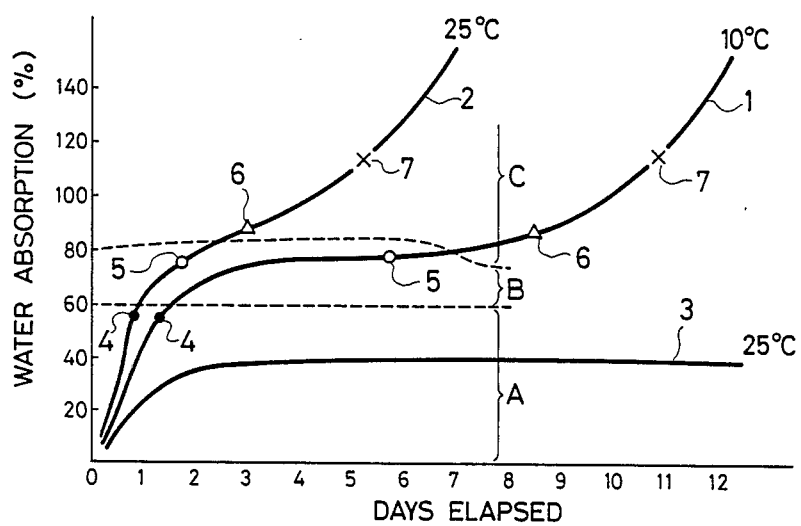
FIG. 1 illustrates the germination steps of a mixture of live and dead seeds of sugar beet caused by absorption of water.
FIG. 2 shows schematic illustrations of the state of sugar beet fruits corresponding to the points of time marked on the curves in FIG. 1.

This invention is an improvement of the technique the present inventor formerly disclosed in Japanese patent application No. 235,331, filed Oct. 23, 1985.

The fruit of sugar beet, generally called seed boil, is 4.0 to 5.0 mm in diameter and 2.0 to 2.6 mm in thickness, and is covered with an outer shell having numerous protrusions and assuming an ocher to dark-brown color. It contains a true seed (hereinafter referred to simply as "seed") including embryo and albumen covered with a testa, each seed being 1.5 to 3.0 mm long and 1.5 mm thick and assuming a whitish yellow color.

This seed, with its seed cap (closely fitted onto the outer shell) released, assumes the reddish-brown color of the exposed testa. It is a kind of nut, because it is completely enveloped in the ovary wall and the ovary itself is perigynous and buried in the dry and hardened receptacle.

Assiduous studies aimed at establishing a method for selecting live seeds of sugar beet out of live and dead seeds have led me to find that a live seed, when immersed in water, absorbs much water and expands significantly to release the fitted seed cap from the outer shell, while a dead seed absorbs little water and expands only slightly, leaving the seed cap closely fitted onto the outer shell. Only live seeds can thus be freed from seed caps by e.g. the application of mechanical vibrations.

Individual seeds absorb water at different speeds and hence do not all germinate at once. Some are very slow in germination activity; some readily release their seed caps; and roots or hypocotyls grow too rapidly in some others, thus tending to be damaged by the mechanical vibrations and failing to grow normally. It is therefore desirable that all the seeds be as even as possible in starting to germinate in order to achieve high sorting efficiency.

In the method of this invention, the fruit of sugar beet is first pretreated (immersion in water to a water absorption amount of about 60%, followed by dehydration and drying) into a state ready for germination, and then subjected to water-absorption treatment to release seed caps. Even germination of seeds can thus be achieved, thereby enabling efficient sorting of live seeds from dead seeds.

In FIG. 1, 1 shows a germination curve when a live seed is immersed in water at 10° C., 2 is a germination curve for a live seed immersed in water at 25° C., and 3 is a germination curve when a dead seed is immersed in water at 25° C.

As can be seen from the figure, rapid absorption of water is observed within two days after the start of the tests in curves 1 and 2 (live seeds), and this tendency continues until the amount of water absorption represented by the following formula reaches about 60%:

Amount of Water Absorption (%) =

$$\frac{\text{Weight of Absorbed Water}}{\text{Weight of Dry Material of Seed}} \times 100$$

This primary, rapid water absorption is called the first water-absorption step A. When the amount of water absorption exceeds about 60%, a step of slow water absorption then follows, which is called the second water-absorption step B. This is followed by a second, rapid water absorption, called the third water-absorption step C. In curve 3 (dead seeds), on the contrary, water absorption progresses at a certain rate for the first two days, and an equilibrium is then established to show no tendency of further absorption, the final absorption amount being about 40% at the highest. As may be apparent from the foregoing, there is a distinct difference in water absorption between live and dead seeds. In addition, the speed of water absorption in live seeds depends on treating temperature, and the time required to reach a given absorption amount is shorter at higher treating temperatures.

The marks on curves 1 and 2 in FIG. 1 correspond to the germination steps shown in FIG. 2; mark 4 to step 1, mark 5 to step 2, mark 6 to step 3, and mark 7 to step 4. FIG. 2 also shows the shape of fruit and the percentage of damaged radicles in each of the germination steps. As may be seen from this figure, no change in state is observed in germination step 1, and an interstice 10 is formed between outer shell 8 and seed cap 9 in step 2, thus making the seed cap ready to be released. Hence, the best timing for the seed-cap releasing treatment is this germination step 2. When germination step 3 is reached, seed cap 9 is still ready to be released, but at the same time radicles 11 protrude over outer shell 8 and may be damaged (as indicated by the numerals in FIG. 2) if sorting is performed in this step. It is clear that step 4, in which germination has progressed further, is also unsuitable for the seed-cap releasing treatment.

Mechanical vibrations are given to the fruit in germination step 2 to release seed caps, and the seeds freed from caps are then sorted from the seeds having caps left attached. Releasing a seed cap exposes the reddish-brown testa covering the seed, which can be easily distinguished from the outer shell by color. Live seeds can thus be sorted from dead seeds visually or instrumentally by utilizing the difference in wavelength. In this case, the outer shell may be dyed or decolorized before treatment to make the color difference more marked. Alternatively, sorting can also be effected by the difference in specific gravity resulting from the release of seed cap, if the pieces of fruit being treated are even in weight.

Experimental results will further illustrate this invention. The data given in Table 1 shows the relationship between cumulative temperature and the rate of seed-cap release caused by mechanical vibrations when the fruit of sugar beet is placed on sheets of paper soaked with water at different temperatures, in which the cumulative temperature, $T_c$(°C.), is a value calculated from the treating temperature, $T_t$(°C.), and treating time, t(Hr), as follows:

$$T_c = \frac{T_t \times t}{24}$$

The rate of seed-cap release (%) is the value when the final number of fruit freed from seed cap (at each treating temperature) is taken as 100.

As can be seen from Table 1, fruit with seed caps released is observed at treating temperatures of 10° C. and higher, and the higher the treating temperature, the larger the number of fruit from which seed caps have been released with the same cumulative temperature. However, the values shown in this table include those fruit in which germination has excessively progressed and radicles have already extended, and such pieces of fruit must be excluded for sorting. Hence, the water-soaked pieces of fruit obtained under the same temperature conditions as above were examined for distribution in the four germination steps. The results are summarized in Table 2.

TABLE 1

Temperature Conditions and Percentage of Seed-cap Release

| $T_c$ (°C.) | $T_t$ (°C.) | | | | | | |
|---|---|---|---|---|---|---|---|
| | 5 | 10 | 15 | 20 | 25 | 30 | 40 |
| 20 | 0% | 0% | 0% | 0% | 0% | 0% | 0% |
| 30 | 0 | 0 | 2 | 6 | 7 | 14 | 10 |
| 40 | 0 | 23 | 33 | 63 | 65 | 62 | 50 |
| 50 | 0 | 50 | 57 | 67 | 68 | 78 | 92 |
| 60 | 0 | 71 | 77 | 81 | 98 | 96 | 100 |
| 70 | 0 | 85 | 90 | 96 | 100 | 100 | 100 |
| 80 | 0 | 92 | 100 | 100 | 100 | 100 | 100 |

$T_t$: Treating temperature (°C.),
$T_c$: Cumulative temperature (°C.)

TABLE 2

Temperature Conditions and Distribution in Germination Steps

| $T_t$ | $T_c$ | Germination step | | | | $T_t$ | $T_c$ | Germination step | | | |
|---|---|---|---|---|---|---|---|---|---|---|---|
| | | 1 | 2 | 3 | 4 | | | 1 | 2 | 3 | 4 |
| 5° C. | 10° C. | 100% | 0% | 0% | 0% | 20° C. | 10° C. | 100% | 0% | 0% | 0% |
| | 20 | 100 | 0 | 0 | 0 | | 20 | 100 | 0 | 0 | 0 |
| | 30 | 100 | 0 | 0 | 0 | | 30 | 94 | 6 | 0 | 0 |
| | 40 | 95 | 5 | 0 | 0 | | 40 | 37 | 51 | 8 | 4 |
| | 50 | 68 | 32 | 0 | 0 | | 50 | 33 | 32 | 26 | 9 |
| | 60 | 53 | 45 | 2 | 0 | | 60 | 19 | 29 | 31 | 21 |
| 10° C. | 10 | 100 | 0 | 0 | 0 | 25° C. | 10 | 100 | 0 | 0 | 0 |
| | 20 | 100 | 0 | 0 | 0 | | 20 | 100 | 0 | 0 | 0 |
| | 30 | 100 | 0 | 0 | 0 | | 30 | 93 | 7 | 0 | 0 |
| | 40 | 77 | 22 | 1 | 0 | | 40 | 35 | 26 | 28 | 11 |
| | 50 | 50 | 46 | 2 | 2 | | 50 | 32 | 30 | 24 | 14 |
| | 60 | 29 | 61 | 6 | 4 | | 60 | 2 | 34 | 36 | 28 |
| 15° C. | 10 | 100 | 0 | 0 | 0 | 30° C. | 10 | 100 | 0 | 0 | 0 |
| | 20 | 100 | 0 | 0 | 0 | | 20 | 100 | 0 | 0 | 0 |
| | 30 | 98 | 2 | 0 | 0 | | 30 | 86 | 14 | 0 | 0 |
| | 40 | 67 | 29 | 3 | 1 | | 40 | 38 | 27 | 23 | 12 |
| | 50 | 43 | 49 | 6 | 2 | | 50 | 22 | 29 | 28 | 21 |
| | 60 | 23 | 50 | 19 | 8 | | 60 | 4 | 29 | 38 | 29 |

$T_t$: Treating temperature (°C.),
$T_c$: Cumulative temperature (°C.)

The data shown in Tables 1 and 2 indicates that, at the same cumulative temperature, a higher treating temperature accelerates the growth of radicles and also brings an uneven germination state, thus increasing the percentage of fruit in which radicles have protruded over the outer shell when the seed caps are to be released. The same tendency is observed also at lower treating temperatures if the cumulative temperature is high enough. Hence the range of temperature conditions is very narrow to achieve a favorable state of germination step 2 that allows effective seed-cap release by mechanical vibrations.

The present invention overcomes such difficulties. In the method of this invention, a mixture of live and dead seeds of sugar beet is immersed in water (the first water-absorption step), the soaked seeds are taken out from water and dried to a moisture content close to the level before the treatment in order to halt the water-absorbing activity of the seeds, and the dried seeds are again allowed to absorb water in a high-humidity atmosphere. The state of germination after the subsequent water absorption can thus be improved significantly.

Seeds of sugar beet, taken out from the same lot as used in the experiment of Table 2, were immersed in 8° C. water (the first water-absorption step), the soaked seeds were air-dried at 30° C. for 48 hours to a water absorption amount of about 5%, and the dry seeds thus obtained were allowed to stand at room temperature for 14 days and treated on water-soaked sheets of filter paper under the same conditions as in the experiments of Tables 1 and 2. The results are shown in Table 3, showing evident improvements over the data of Table 2. To be more specific, the time required to reach germination step 2 is shorter with the same treating temperature; the time to reach germination step 3 is longer at a treating temperature up to 15° C. and slightly shorter at a temperature of 20° C. or higher; and the time needed to reach germination step 4 is longer at any treating temperatures. This comparison between the data of Tables 2 and 3 is summarized in Table 4, which clearly indicates the improved germination behavior achieved by the pretreatment (primary water absorption, followed by drying).

TABLE 3

Pretreated Seeds and Distribution in Germination Steps (%)

| $T_t$ | $T_c$ | Germination step | | | | $T_t$ | $T_c$ | Germination step | | | | $T_t$ | $T_c$ | Germination step | | | |
|---|---|---|---|---|---|---|---|---|---|---|---|---|---|---|---|---|---|
| | | 1 | 2 | 3 | 4 | | | 1 | 2 | 3 | 4 | | | 1 | 2 | 3 | 4 |
| 5° C. | 10° C. | 100% | 0% | 0% | 0% | 20° C. | 10° C. | 82% | 18% | 0% | 0% | 35° C. | 10° C. | 74% | 26% | 0% | 0% |
| | 20 | 100 | 0 | 0 | 0 | | 20 | 68 | 32 | 0 | 0 | | 20 | 60 | 40 | 0 | 0 |
| | 30 | 98 | 2 | 0 | 0 | | 30 | 53 | 45 | 2 | 0 | | 30 | 26 | 60 | 14 | 0 |
| | 40 | 82 | 18 | 0 | 0 | | 40 | 27 | 68 | 5 | 0 | | 40 | 2 | 85 | 13 | 0 |
| | 50 | 60 | 40 | 0 | 0 | | 50 | 0 | 94 | 6 | 0 | | 50 | 1 | 82 | 12 | 5 |
| | 60 | 22 | 78 | 0 | 0 | | 60 | 0 | 91 | 7 | 2 | | 60 | 0 | 75 | 18 | 7 |
| | 70 | 11 | 89 | 0 | 0 | | 70 | 0 | 84 | 9 | 7 | | 70 | 0 | 60 | 28 | 12 |
| | 80 | 5 | 93 | 2 | 0 | | 80 | 0 | 62 | 26 | 12 | | 80 | 0 | 48 | 34 | 18 |
| 10° C. | 10 | 100 | 0 | 0 | 0 | 25° C. | 10 | 72 | 28 | 0 | 0 | | | | | | |
| | 20 | 99 | 1 | 0 | 0 | | 20 | 55 | 43 | 2 | 0 | | | | | | |
| | 30 | 61 | 39 | 0 | 0 | | 30 | 26 | 71 | 3 | 0 | | | | | | |
| | 40 | 35 | 65 | 1 | 0 | | 40 | 1 | 91 | 8 | 0 | | | | | | |

TABLE 3-continued

Pretreated Seeds and Distribution in Germination Steps (%)

| $T_t$ | $T_c$ | Germination step 1 | 2 | 3 | 4 | $T_t$ | $T_c$ | Germination step 1 | 2 | 3 | 4 | $T_t$ | $T_c$ | Germination step 1 | 2 | 3 | 4 |
|---|---|---|---|---|---|---|---|---|---|---|---|---|---|---|---|---|---|
| | 50 | 12 | 85 | 3 | 0 | | 50 | 0 | 89 | 9 | 2 | | | | | | |
| | 60 | 0 | 96 | 4 | 0 | | 60 | 0 | 85 | 12 | 3 | | | | | | |
| | 70 | 0 | 92 | 8 | 0 | | 70 | 0 | 72 | 21 | 7 | | | | | | |
| | 80 | 0 | 81 | 18 | 1 | | 80 | 0 | 60 | 28 | 12 | | | | | | |
| 15° C. | 10 | 94 | 6 | 0 | 0 | 30° C. | 10 | 78 | 22 | 0 | 0 | | | | | | |
| | 20 | 75 | 25 | 0 | 0 | | 20 | 62 | 38 | 0 | 0 | | | | | | |
| | 30 | 58 | 42 | 0 | 0 | | 30 | 35 | 61 | 4 | 0 | | | | | | |
| | 40 | 28 | 71 | 1 | 0 | | 40 | 2 | 90 | 8 | 0 | | | | | | |
| | 50 | 2 | 95 | 3 | 0 | | 50 | 0 | 86 | 11 | 3 | | | | | | |
| | 60 | 0 | 96 | 4 | 0 | | 60 | 0 | 79 | 16 | 5 | | | | | | |
| | 70 | 0 | 91 | 8 | 1 | | 70 | 0 | 65 | 25 | 10 | | | | | | |
| | 80 | 0 | 77 | 21 | 2 | | 80 | 0 | 52 | 34 | 14 | | | | | | |

Note
Cumulative temperature does not include pretreatment temperature.

TABLE 4

Effect of Pretreatment on Development of Germination Step 2

| | $T_t$ | | | | | | | | | | |
|---|---|---|---|---|---|---|---|---|---|---|---|
| | 5° C. | | 10° C. | | 15° C. | | 20° C. | | 25° C. | | 30° C. | |
| $T_c$ | Table 2 | Table 3 | Table 2 | Table 3 | Table 2 | Table 3 | Table 2 | Table 3 | Table 2 | Table 3 | Table 2 | Table 3 |
| 10° C. | 0 | 0 | 0 | 0 | 0 | 6 | 0 | 18 | 0 | 28 | 0 | 22 |
| 20 | 0 | 0 | 0 | 1 | 0 | 25 | 0 | 32 | 0 | 43 | 0 | 38 |
| 30 | 0 | 2 | 0 | 39 | 2 | 42 | 6 | 45 | 7 | 71 | 4 | 61 |
| 40 | 5 | 18 | 22 | 65 | 29 | 71 | 51 | 68 | 26 | 91 | 27 | 90 |
| 50 | 32 | 40 | 46 | 85 | 49 | 95 | 32 | 94 | 30 | 89 | 29 | 86 |
| 60 | 45 | 78 | 61 | 96 | 50 | 96 | 29 | 91 | 34 | 85 | 29 | 79 |

$T_t$: Treating temperature
$T_c$: Cumulative temperature

As is apparent from the foregoing, a significant improvement in the transfer of soaked seeds to the steps of germination can be achieved if a mixture of live and dead seeds is immersed in water (the first water-absorption step), the soaked seeds are taken out of water and dried to a moisture content close to the level before the treatment in order to halt the water-absorbing activity of the seeds, and the dried seeds are again allowed to absorb water for the start of germination. The number of seeds that are at germination step 2 amounts to 93% at a treating temperature of 5° C. and a cumulative temperature of 80° C. At higher temperatures (treating temperatures: 35° C., cumulative temperature: 40° C.), the number of seeds that are in germination steps 2 and 3 amounts to 85% and 13%, respectively, with no seed at germination step 4. Since there is still some difference in the growth rate among individual seeds, it is necessary to recover cap-free seeds in several stages according to suitable ranges of cumulative temperature for a given treating temperature. A typical example for such repeated recovery processes is shown in Table 5 below.

TABLE 5

Temperature Conditions and Recovery Rate of Selected Seeds

| Treating Temp. (°C.) | Cumulative Temp. (°C.) at Recovery Operation | | |
|---|---|---|---|
| | 1st operation | 2nd operation | 3rd operation |
| 5~9 | 30~40 | 41~60 | 61~80 |
| 10~15 | 25~35 | 36~55 | 56~75 |
| 16~21 | 20~30 | 31~50 | 51~70 |
| 22~27 | 15~25 | 26~45 | 46~65 |
| 28~35 | 10~20 | 21~40 | 41~60 |
| Recovery Rate of Selected Seeds | 30~50% | 50~80% | 80~100% | effectively obtain uniform seeds that are ready for seed-cap releasing is preferably in the range from about 5° to 40° C., and the preferable immersion time is in the range from 2° to 20° C. as expressed in cumulative temperature.

The final soaking operation to induce germination is performed at a treating temperature in the range from about 5° to 35° C. over a period of time in the range from 2° to 20° C. expressed in cumulative temperature, thus making the seed caps ready to be released from the outer shells and leaving the radicles left unprotruded. The suitable relative humidity during this operation is 70 to 100%. There is no specific limitation upon the type of mechanical vibrations to be given for releasing the seed caps. For example, satisfactory results may be obtained by operating a vibrating sieve for 30 to 120 seconds at an amplitude of 100 to 300 mm.

The fruit treated and selected according to the method of this invention may be sown at once, or may also be stored after drying.

In an experiment, pretreatment was conducted at the treating temperatures shown in Table 3 (cumulative temperature: 40° C.), mechanical vibrations were given to release seed caps, the pieces of fruit freed from seed caps were dried in a hot-air dryer for 24 hours (30° C.; 0 to 20% R.H.; hot-air flow rate: 0.3 m/sec), the dried fruit was settled on water-soaked sheets of filter paper at 20° C. for five days, and each piece was determined to be live or dead from the presence or absence of grown radicles and germs. The results are summarized in Table 6.

As can be seen from Table 6, high seed-cap releasing rates were achieved with a cumulative temperature of 40° C. (except at a treating temperature of 5° C.), with no damaged seeds being observed at treating temperatures of 25° C. and lower. It was also demonstrated that almost all the dried seeds germinated normally. The hot-air drying may be replaced by the granulation process using kaolin or the like as a coating compound, which facilitates machine sowing without any adverse effect upon germination.

TABLE 6

| Treating Temp. (°C.) | Survival Rate of Treated and Recovered Fruit | | | | | | |
|---|---|---|---|---|---|---|---|
| | 5 | 10 | 15 | 20 | 25 | 30 | 35 |
| Number of seed caps released | 36 | 130 | 144 | 146 | 198 | 196 | 196 |
| Rate of seed cap release (%) | 18 | 65 | 72 | 73 | 99 | 98 | 98 |
| Number of damaged seeds | 0 | 0 | 0 | 0 | 0 | 1 | 2 |
| Number of dried seeds | 36 | 130 | 144 | 146 | 198 | 195 | 194 |
| Number of live seeds | 36 | 130 | 144 | 146 | 198 | 194 | 190 |
| Rate of live seeds (%) | 100 | 100 | 100 | 100 | 100 | 99 | 93 |
| Rate of damaged seeds (%) | 0 | 0 | 0 | 0 | 0 | 0.5 | 1.0 |

As may be apparent from the foregoing, the method of this invention readily distinguishes live seeds of sugar beet from dead seeds based on the case of seed-cap releasing, thus achieving high-accuracy sorting of live seeds with no need for any sophisticated equipment.

The seeds of sugar beet sorted out according to the method of this invention germinate without failure when sown directly or by use of Paperpot ®. Significantly higher efficiency can thus be expected in sugar beet planting.

The following Examples will further illustrate the invention.

EXAMPLE 1

A glass vessel measuring 400 mm × 400 mm × 600 mm containing 9 liters of water (10° C.) was used as a soaking apparatus. Five thousand pieces of sugar beet fruit, Kawamegamono (variety) were immersed in the water for four hours, dehydrated by means of a centrifugal dewaterer, and dried in a hot-air dryer for 24 hours (30° C.; hot-air flow rate: 0.3 m/sec). The dry fruit was allowed to stand at room temperature for 14 days before being subjected to soaking for germination.

No. 1 filter paper (Toyo Filter Paper) was laid on the bottom of a closed, stainless steel container (600 mm × 600 mm × 50 mm) and saturated with water by addition of 85 ml water (20° C.). On this wet filter paper, were placed the 5,000 pieces of dry fruit obtained above at 10° C. and 100% R.H. for 96 hours (corresponding to a cumulative temperature of 40° C.). The treated fruit was taken out from the container and given mechanical vibrations on a vibrating sieve for one minute (amplitude: 250 mm; frequency: 60 cycle/min). The seed caps released from the fruit were then removed by means of a 2 mm sieve on a rice sorter (Santoku-type), the fruit freed from seed caps and left on the sieve was transferred onto a flat dish, and the pieces of fruit from which seed caps have been released were visually selected from those with seed caps left attached. The former group (3,250 pieces, 65%) was immediately dried in a hot-air dryer (30° C.; 0 to 20% R.H.; hot-air flow rate: 0.3 m/sec).

The pieces of fruit with seed caps left attached were again subjected to the soaking and vibrational treatment, finally yielding a total of 4,400 pieces (88%) of fruit freed from seed caps.

The pieces of dry fruit thus selected out were rolled on a seed granulator (Model KSC-2-1, Kojin Co.) together with a coating compound containing 0.5% of a powdery antimicrobial agent against damping-off (Tachigaren ®) while spraying a predetermined amount of synthetic binder, giving granules 4.0 to 5.0 mm in diameter. The coated seeds thus obtained were sown in Paperpot ® (one in each pot) to grow seedlings. Granules of untreated seeds coated in the same manner were also grown as the control group under the same conditions. The results are shown in Table 7, in which the seedling yield is the rate of seedlings that could be transplanted among the grown seedlings.

TABLE 7

| Seedling Culture Test | | |
|---|---|---|
| | Test Gp. | Control Gp. |
| Time required for germination (days) | 3 | 9 |
| Germination rate on 15th day (%) | 100 | 85 |
| Seedling yield (%) | 99 | 65 |
| 40-Day seedings: | | |
| Length of leaves (cm) | 9.2 | 6.5 |
| Number of leaves | 4.8 | 3.2 |
| Dry weight (mg/plant) | 41 | 20 |

EXAMPLE 2

Sugar beet monoembryonic fruit Monohill (variety) was pretreated (immersion in water) under the same conditions as in Example 1, then subjected to soaking for germination in Model FD 105 Germination Tank (Fluid Drilling Ltd. of Great Britain) at 15° C. under aeration of 2 1/min for 64 hours (corresponding to a cumulative temperature of 40° C.), and finally treated (mechanical vibration treatment) in the same manner as in Example 1. The still wet, cap-free seeds thus obtained were transferred to the same granulator as above and subjected to coating with NN Kaolin Clay while intermittently spraying 1% solution of methylcellulose (4000 cps), giving granules 4.0 to 5.0 mm in diameter. The granules thus prepared were immediately dried in a hot-air dryer at 35° C. for 24 hours (relative humidity: 0 to 20%; hot-air flow rate: 0.5 m/sec), stored for 180 days, and sown in a farm at definite intervals. The seeds sown all germinated at one time, with no missing seedlings. There was no need for thinning work, and little labor was required for cultivation and other care work, proving the high effectiveness of the method of this invention.

EXAMPLE 3

Sugar beet polyembryonic fruit Kawepoly (variety) was immersed in 20° C. water for two hours under aeration of 2 1/min using a bubbling-type, hot-water germinator (50-liter capacity). The water-soaked fruit was dehydrated in the same manner as in Example 1, air-dried at 25° C. for 72 hours, and stored at 5° C. under a relative humidity of 40 to 70% for 90 days. The stored fruit was again treated in the same germinator as above at 5° C. for 240 hours (corresponding to a cumulative temperature of 50° C.) under aeration of 10 1/min to induce germination, immediately air-dried at 20° C. for 72 hours, and then treated for three minutes on a vibrating sieve (2.5 mm round openings; amplitude: 200 mm; frequency: 120 cycle/min), thus allowing only the live seeds to fall through the sieve and leaving on the sieve the fruit with seed caps left attached, seed caps released, and outer shells.

The live seeds thus selected were subjected to coating with a compound containing 30% by volume of bentonite, 30% perlite, 20% peat moss and 20% calcium carbonate while intermittently spraying 10% solution of polyvinyl alcohol, giving granules 3.0 to 4.0 mm in diameter. The granules thus prepared were dried in the same manner as in Example 2, stored for 360 days, and sown in a farm at definite intervals. The seeds sown all germinated at one time, with no missing seedlings at all, and all the seedlings grew favorably.

What is claimed:

1. A method for selecting live seeds of sugar beet from dead seeds comprising the following steps:
    a first water-absorbing step including immersing a mixture of live seeds and dead seeds in water to raise the water content of the seeds to prepare the live seeds for germination;
    drying the mixture of live seeds and dead seeds;
    a second water-absorbing step comprising allowing the dried mixture of live seeds and dead seeds to absorb water in a controlled high humidity condition to bring the live seeds to germination wherein the seed caps are ready to be released; and
    releasing seed caps from the mixture of live seeds and dead seeds by mechanical vibrations to the mixture obtained from the second step and sorting live seeds which have released their seed caps from dead seeds which have retained their seed caps.

2. The method as defined in claim 1, wherein the amount of water absorption at the end of the first water-absorbing step is about 60%.

3. The method as defined in claim 1, wherein the second water-absorbing step is conducted at a treating temperature in the range from 5° to 35° C. and at a cumulative temperature in the range from 10° to 80° C.

* * * * *

UNITED STATES PATENT AND TRADEMARK OFFICE
CERTIFICATE OF CORRECTION

PATENT NO. : 4,837,970
DATED : June 13, 1989
INVENTOR(S) : Yukio SASAKI

It is certified that error appears in the above-identified patent and that said Letters Patent is hereby corrected as shown below:

In Table 3, fifth column, line 12, change "1" to --0--.

Col. 7, line 66, before "effectively" insert --The temperature of water used for the pretreatment to--.

Col. 9, line 32, change "Kawamegamono" to --Kawemegamono--.

Signed and Sealed this

Eighth Day of May, 1990

Attest:

HARRY F. MANBECK, JR.

*Attesting Officer*  *Commissioner of Patents and Trademarks*